US012582266B1

(12) United States Patent
Cowles

(10) Patent No.:     US 12,582,266 B1
(45) Date of Patent:      Mar. 24, 2026

(54) SURFACE SUPPORT APPARATUS AND METHODS FOR USING THE SAME

(71) Applicant: William H. Cowles, Brookline, MA (US)

(72) Inventor: William H. Cowles, Brookline, MA (US)

( * ) Notice: Subject to any disclaimer, the term of this patent is extended or adjusted under 35 U.S.C. 154(b) by 0 days.

(21) Appl. No.: 18/420,185

(22) Filed: Jan. 23, 2024

Related U.S. Application Data

(60) Provisional application No. 63/440,814, filed on Jan. 24, 2023.

(51) Int. Cl.
F16M 11/00     (2006.01)
A47J 45/10     (2006.01)

(52) U.S. Cl.
CPC ..................................... A47J 45/10 (2013.01)

(58) Field of Classification Search
CPC ....................................................... A47J 45/10
See application file for complete search history.

(56)     References Cited

U.S. PATENT DOCUMENTS 2,269,941 A * 1/1942 Jones ...................... A63B 67/00
                                                              473/588
2,555,222 A * 5/1951 Coleman ................ A63B 57/15
                                                              473/390

3,967,576 A * 7/1976 Soerensen ............... E01F 9/654
                                                              116/63 P
5,310,189 A * 5/1994 Soto ....................... A63B 53/00
                                                              473/390
9,808,687 B1 * 11/2017 Kalcich .................. A63B 57/13

* cited by examiner

*Primary Examiner* — Amy J. Sterling
(74) *Attorney, Agent, or Firm* — Byrne Poh LLP

(57)     ABSTRACT

A surface support apparatus and methods for using the same are provided. In some embodiments, a tetrahedron structure having a centroid at a geometric center of the tetrahedron structure, four vertices of the tetrahedron structure, and four leg portions that each extend outwardly from the centroid of the tetrahedron structure to one of the four vertices of the tetrahedron structure is provided, where: (i) each leg portion has a body portion having a tubular shape and a leg tip portion located at an end of a leg portion and around one of the four vertices of the tetrahedron structure that opposes the centroid of the tetrahedron structure, wherein the leg tip portion includes a contact support surface formed at one of the four vertices of the tetrahedron structure; (ii) each leg portion of the four leg portions has a same length and a same volume as other leg portions in the tetrahedron structure; and (iii) the four leg portions are equally distributed in position around the centroid to form four equivalent sub-polyhedron volumes of the tetrahedron structure such that the tetrahedron structure has an overall height from a resting surface to the contact support surface regardless of which three of the four leg portions are placed on the resting surface; and wherein the surface support apparatus and at least one additional surface support apparatus are configured to support an object on the contact support surface of one leg portion from each of the surface support apparatus and the at least one additional surface support apparatus at the overall height of each of the plurality of surface support apparatuses over the resting surface.

19 Claims, 6 Drawing Sheets

100

A                                                                    A

400

500

620

600

610

B

B

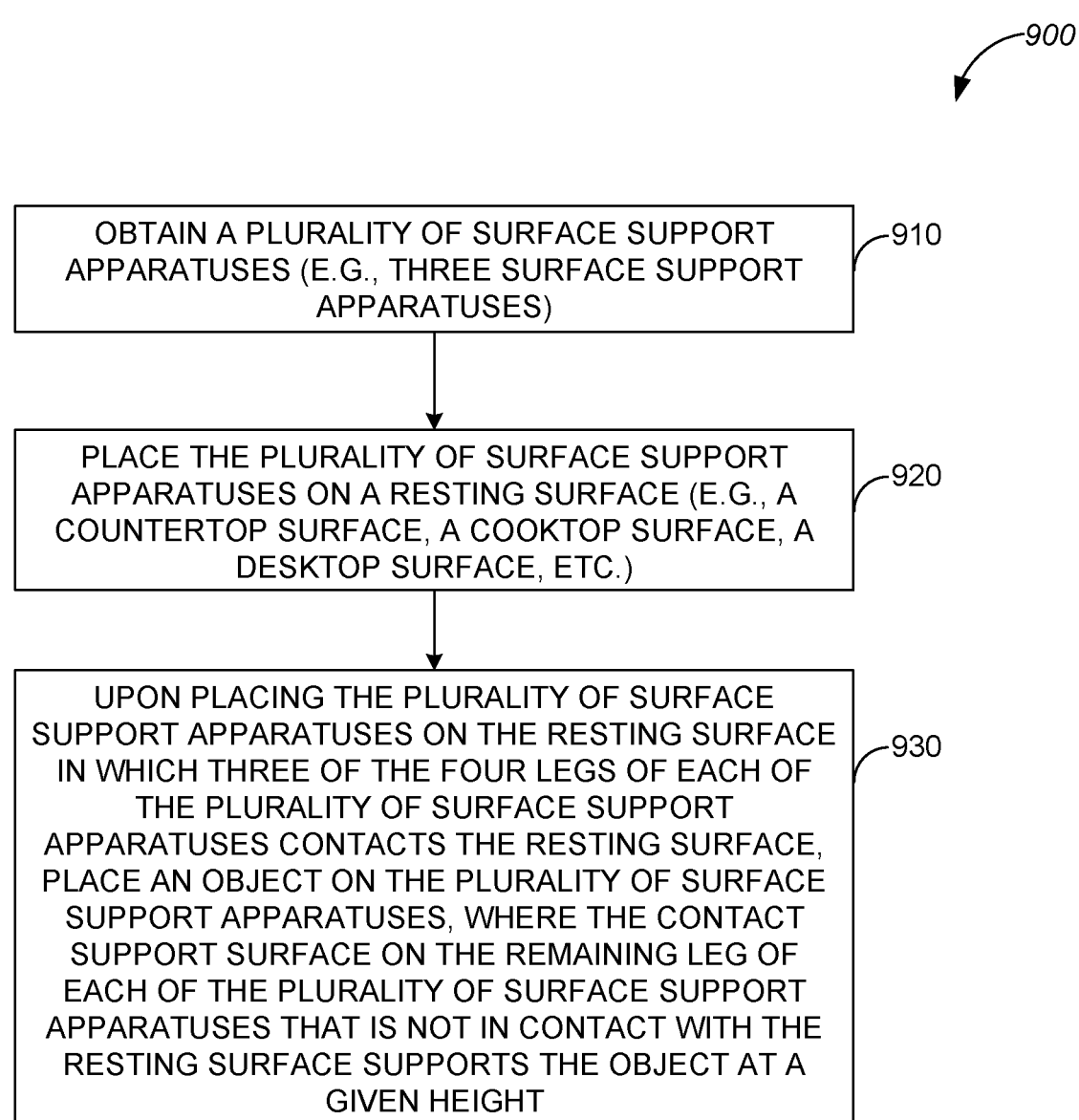

900

OBTAIN A PLURALITY OF SURFACE SUPPORT APPARATUSES (E.G., THREE SURFACE SUPPORT APPARATUSES)  ⌐910

PLACE THE PLURALITY OF SURFACE SUPPORT APPARATUSES ON A RESTING SURFACE (E.G., A COUNTERTOP SURFACE, A COOKTOP SURFACE, A DESKTOP SURFACE, ETC.)  ⌐920

UPON PLACING THE PLURALITY OF SURFACE SUPPORT APPARATUSES ON THE RESTING SURFACE IN WHICH THREE OF THE FOUR LEGS OF EACH OF THE PLURALITY OF SURFACE SUPPORT APPARATUSES CONTACTS THE RESTING SURFACE, PLACE AN OBJECT ON THE PLURALITY OF SURFACE SUPPORT APPARATUSES, WHERE THE CONTACT SUPPORT SURFACE ON THE REMAINING LEG OF EACH OF THE PLURALITY OF SURFACE SUPPORT APPARATUSES THAT IS NOT IN CONTACT WITH THE RESTING SURFACE SUPPORTS THE OBJECT AT A GIVEN HEIGHT  ⌐930

FIG. 9

SURFACE SUPPORT APPARATUS AND METHODS FOR USING THE SAME

CROSS-REFERENCE TO RELATED APPLICATIONS

This application claims the benefit of U.S. Provisional Patent Application No. 63/440,814, filed Jan. 24, 2023, which is hereby incorporated by reference herein in its entirety.

TECHNICAL FIELD

The disclosed subject matter relates to a surface support apparatus and methods for using the same.

BACKGROUND

When placing a hot food item, such as a baking sheet, on a countertop, many countertops can be damaged by such a hot food item without adequate protection, where the countertop can receive varying amounts of damage from a discoloration of a portion of the countertop surface to a crack of the countertop surface. When a baking sheet is placed on a glass induction stove, the sensors associated with the glass induction stove can generate an alarm state that renders the surface unusable. As a result, many individuals use wooden blocks, cutting boards, silicone mats, towels, and/or other flat objects to protect the countertop.

These wooden blocks, cutting boards, silicone mats, towels, and/or other flat objects to protect the countertop are often thick to insulate the heat from the hot food item being handled. As a result, such protective items, however, are cumbersome in the kitchen. For example, it is difficult to safely manipulate hot food items when placed on these protective items (e.g., using an oven mitt when lifting from under a baking sheet or a heavy pot). In another example, these protective objects tend to occupy valuable storage space within a person's kitchen.

Accordingly, it is desirable to provide new mechanisms for providing surface support apparatuses and methods for using the same.

SUMMARY

In accordance with various embodiments of the disclosed subject matter, a surface support apparatus and methods for using the same are provided.

In accordance with some embodiments of the disclosed subject matter, a surface support system is provided, the surface support system comprising: a plurality of surface support apparatuses, wherein each of the plurality of surface support apparatuses comprises a tetrahedron structure having a centroid at a geometric center of the tetrahedron structure, four vertices of the tetrahedron structure, and four leg portions that each extend outwardly from the centroid of the tetrahedron structure to one of the four vertices of the tetrahedron structure, wherein each leg portion has a body portion having a tubular shape and a leg tip portion located at an end of a leg portion and around one of the four vertices of the tetrahedron structure that opposes the centroid of the tetrahedron structure, wherein the leg tip portion includes a contact support surface formed at one of the four vertices of the tetrahedron structure, wherein each leg portion of the tetrahedron structure has a same length and a same volume as other leg portions in the tetrahedron structure, and wherein the four leg portions are equally distributed in position around the centroid to form four equivalent sub-polyhedron volumes of the tetrahedron structure such that the tetrahedron structure has an overall height from a resting surface to the contact support surface regardless of which three of the four leg portions are placed on the resting surface. The plurality of surface support apparatuses are configured to support an object on the contact support surface of one leg portion from each of the plurality of surface support apparatuses at the overall height of each of the plurality of surface support apparatuses over the resting surface.

In some embodiments, the plurality of surface support apparatus are three surface support apparatuses used to support the object on the contact support surface of one leg portion from each of the three surface support apparatuses.

In some embodiments, each leg portion of each of the plurality of surface support apparatuses includes an outer portion and an inner portion, where the outer portion of each leg portion is composed of a first material and where the inner portion of each leg portion is composed of a second material.

In some embodiments, the tubular shape of each leg portion of each of the plurality of surface support apparatuses tapers in thickness from the centroid of the tetrahedron structure towards the contact support surface formed at one of the four vertices of the tetrahedron structure.

In some embodiments, each leg portion of each of the plurality of surface support apparatuses includes an outer portion and an inner portion, where the inner portion of each leg portion is composed of a magnetic material, and where the magnetic material interacts with at least one of the resting surface and the plurality of surface support apparatuses.

In some embodiments, at least one of the four leg portions of the tetrahedron structure is configured to include a wireless communication circuit within the inner portion of a leg portion.

In some embodiments, the leg tip portion has a rounded shape.

In some embodiments, the leg tip portion has a pointed shape.

In some embodiments, the leg tip portion is composed of a different material than the body portion of each leg portion.

In some embodiments, the leg tip portion is configured to include at least one sensor.

In accordance with some embodiments of the disclosed subject matter, a surface support apparatus is provided, the surface support apparatus comprising: a tetrahedron structure having a centroid at a geometric center of the tetrahedron structure, four vertices of the tetrahedron structure, and four leg portions that each extend outwardly from the centroid of the tetrahedron structure to one of the four vertices of the tetrahedron structure, wherein each leg portion has a body portion having a tubular shape and a leg tip portion located at an end of a leg portion and around one of the four vertices of the tetrahedron structure that opposes the centroid of the tetrahedron structure, wherein the leg tip portion includes a contact support surface formed at one of the four vertices of the tetrahedron structure, wherein each leg portion of the four leg portions has a same length and a same volume as other leg portions in the tetrahedron structure, and wherein the four leg portions are equally distributed in position around the centroid to form four equivalent sub-polyhedron volumes of the tetrahedron structure such that the tetrahedron structure has an overall height from a resting surface to the contact support surface regardless of which three of the four leg portions are placed on the resting surface. The surface support apparatus and at least one additional surface support apparatus are configured to support an object on the contact support surface of one leg portion from each of the surface support apparatus and the at least one additional surface support apparatus at the overall height of each of the plurality of surface support apparatuses over the resting surface.

In some embodiments, each leg portion includes an outer portion and an inner portion, where the outer portion of each leg portion is composed of a first material and where the inner portion of each leg portion is composed of a second material.

In some embodiments, the tubular shape of each leg portion of the surface support apparatus tapers in thickness from the centroid of the tetrahedron structure towards the contact support surface formed at one of the four vertices of the tetrahedron structure.

In some embodiments, each leg portion includes an outer portion and an inner portion, where the inner portion of each leg portion is composed of a magnetic material, and where the magnetic material interacts with at least one of the resting surface and another surface support apparatus.

In some embodiments, at least one of the four leg portions of the tetrahedron structure is configured to include a wireless communication circuit.

In some embodiments, the leg tip portion has a rounded shape.

In some embodiments, the leg tip portion has a pointed shape.

In some embodiments, the leg tip portion is composed of a different material than the body portion of each leg portion.

In some embodiments, the leg tip portion is configured to include at least one sensor.

In accordance with some embodiments of the disclosed subject matter, a method for using a surface support system is provided, the method comprising: placing a plurality of surface support apparatuses on a resting surface, wherein each of the plurality of surface support apparatuses comprises a tetrahedron structure having a centroid at a geometric center of the tetrahedron structure, four vertices of the tetrahedron structure, and four leg portions that each extend outwardly from the centroid of the tetrahedron structure to one of the four vertices of the tetrahedron structure, wherein each leg portion has a body portion having a tubular shape and a leg tip portion located at an end of a leg portion and around one of the four vertices of the tetrahedron structure that opposes the centroid of the tetrahedron structure, wherein the leg tip portion includes a contact support surface formed at one of the four vertices of the tetrahedron structure, wherein each leg portion of the four leg portions has a same length and a same volume as other leg portions in the tetrahedron structure, and wherein the four leg portions are equally distributed in position around the centroid to form four equivalent sub-polyhedron volumes of the tetrahedron structure such that the tetrahedron structure has an overall height from a resting surface to the contact support surface regardless of which three of the four leg portions are placed on the resting surface; and, upon placing the plurality of surface support apparatuses on the resting surface in which three of the four leg portions of each of the plurality of surface support apparatuses contacts the resting surface, placing an object having a top surface and a bottom surface on the plurality of surface support apparatuses, wherein the plurality of surface support apparatuses are configured to support the object on the contact support surface of one leg portion from each of the plurality of surface support apparatuses at the overall height of each of the plurality of surface support apparatuses over the resting surface.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 9 is an illustrative example of a process for using a plurality of surface support apparatus to support one or more objects in accordance with some embodiments of the disclosed subject matter.

DETAILED DESCRIPTION

Figure 1:
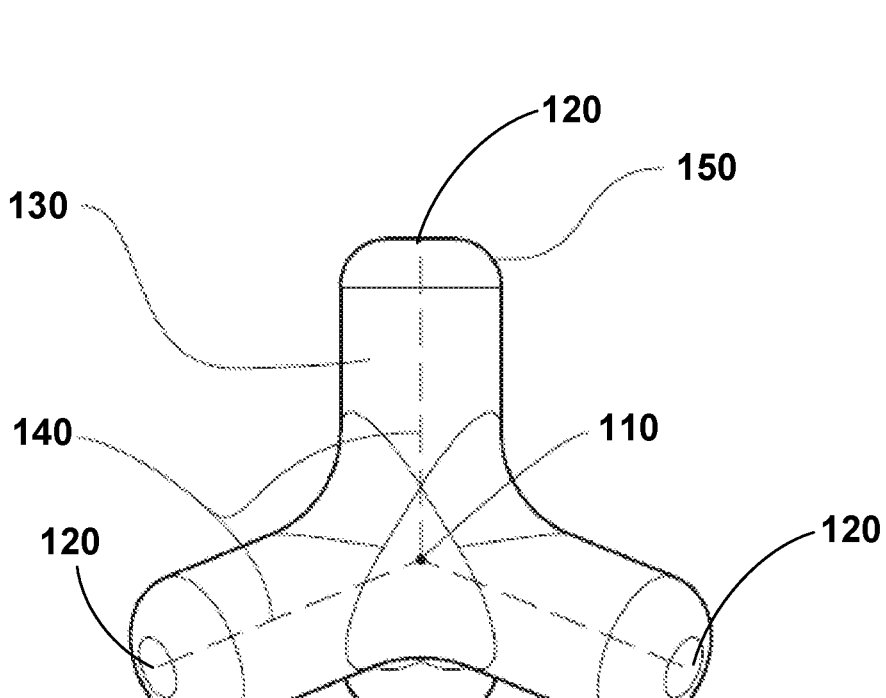
FIG. 1 is a front view of a surface support apparatus, where three legs of the surface support apparatus can be in contact with a resting surface and where a contact support surface at the tip of the remaining leg of the surface support apparatus can support an object, in accordance with some embodiments of the disclosed subject matter.

In accordance with various embodiments of the disclosed subject matter, surface support mechanisms and methods for using surface support mechanisms are provided.

Generally speaking, a surface support apparatus having a four-legged tetrahedron structure is provided, where the surface support apparatus has a centroid at a geometric center of the tetrahedron structure and where each of the four legs of the surface support apparatus have the same length as other legs and extend outwardly from the centroid of the tetrahedron structure to one of the four vertices of the tetrahedron structure. Moreover, each of the four legs of the surface support apparatus can be equally distributed in position around the centroid to form four equivalent sub-polyhedron volumes of the tetrahedron structure. This can, for example, allow the surface support apparatus to be supported on a resting surface by three of the four legs of the tetrahedron structure at all times in response to dropping, throwing, or otherwise placing the surface support apparatus on the resting surface (e.g., a countertop, a stovetop, a desktop, a cutting board, etc.). This can also allow the remaining leg of the tetrahedron that is not in contact with the resting surface, which has a contact support surface formed about the tip portion of the leg, in combination with another surface support apparatus and its corresponding contact support surface to support an object at an overall vertical height from the resting surface to the contact support surface. For example, regardless of which three legs of the four-legged tetrahedron structure support a surface support apparatus that has been dropped, thrown, or otherwise placed on a resting surface, an object placed on the contact support surface of multiple surface support apparatuses can be supported at a contact vertical height (e.g., the distance between the resting surface and the overall height of the surface support apparatus).

It should be noted that, in some embodiments, each leg of the surface support apparatus can have a body portion that has a tubular shape and a leg tip portion located at an end of a leg that opposes the centroid of the tetrahedron structure. The surface support apparatus can have structural stability and a reduced material mass in part due to the tubular shape of each leg of the surface support apparatus. For example, the tubular shape of each leg of the surface support apparatus can taper in thickness from the centroid of the tetrahedron structure towards the contact support surface formed at one of the four vertices of the tetrahedron structure. In continuing this example, in some embodiments, each leg of the surface support apparatus can have an outer portion and an inner portion, where the outer portion of each leg portion can be composed of a first material (e.g., a stainless steel, metal, or polymeric material) and where the inner portion of each leg portion can be composed of a second material (e.g., air such that the leg has a hollow interior cavity). In another example, the outer portion of each leg portion can be composed of a first material, such as food-grade silicone, and the inner portion of each leg portion can be composed of a second material, such as stainless steel.

It should also be noted that, although the embodiments described herein show that each leg of the surface support apparatus has a generally tubular shape, this is merely illustrative. In some embodiments, each leg of the surface support apparatus can have a triangular tube shape in which the cross-section of the leg is generally triangular. In some embodiments, each leg of the surface support apparatus can have a triangular tube shape that tapers in thickness from the centroid of the tetrahedron structure towards the contact support surface formed at one of the four vertices of the tetrahedron structure in which the cross-section of the leg is generally triangular.

Additionally or alternatively, in some embodiments, each leg of the surface support apparatus can have an outer portion that is composed of a first material, such as a silicone rubber material, and one or more magnetic elements can be positioned with an inner portion of each leg portion. For example, the magnetic elements within a leg of a surface support apparatus can interact with the magnetic elements within a leg of another surface support apparatus (e.g., an adjacent surface support apparatus that is within the magnetic field of the magnetic elements within the leg of the surface support apparatus). In a more particular example, a first magnetic element within a leg of a first surface support apparatus and a second magnetic element with a leg of a second surface support apparatus can be configured to magnetically couple such that the first surface support apparatus and the second support apparatus remain within a particular region for supporting one or more objects. In another more particular example, a first magnetic element within a leg of a first surface support apparatus and a second magnetic element with a leg of a second surface support apparatus can be configured to magnetically couple to connect the first surface support apparatus and the second surface support apparatus, thereby forming a larger contact support surface.

Additionally or alternatively, in some embodiments, one or more legs of the surface support apparatus can be configured to include a wireless communication circuit within the inner portion of a leg. For example, a wireless communication circuit can be positioned in the inner portion of a leg for interfacing with one or more communication networks. In continuing this example, each tip portion of the surface support apparatus can be configured to include one or more sensors (e.g., temperature sensors, pressure sensors, touch sensors, etc.), where the wireless communication circuit can be configured to transmit sensor data from any suitable sensors within the surface support apparatus to a mobile application or any other suitable computing device. In a more particular example, the wireless communication circuit can be configured to transmit sensor data indicating that a surface support apparatus is currently in use (e.g., sensor data from a pressure sensor can indicate that an object has been positioned on a contact support surface of a leg of the surface support apparatus, sensor data from a temperature sensor can indicate an approximate surface temperature of an object that is in contact with a contact support surface of a leg of the surface support apparatus, etc.).

It should be noted that, in some embodiments, at least three surface support apparatuses can be used to support an object above a resting surface on which the at least three surface support apparatuses are placed, where the contact support surface of each of the at least three surface support apparatuses can support the object at a uniform height above the resting surface. Any suitable number of surface support apparatuses can be used to support an object. For example, the number of surface support apparatuses can be dependent on the dimensions of the object, the weight of the object, the application (e.g., supporting an object for cooling over a resting surface on which objects having a temperature greater than a particular value should not be placed, supporting an object to increase airflow beneath at least a portion of the object, etc.).

These surface support apparatuses can be used in any suitable application. For example, three surface support apparatuses can be placed on a countertop or an induction cooktop to act as a trivet and an object, such as a heated baking sheet that was removed from an oven, can be placed on the contact support surface created by the three surface support apparatuses, thereby improving airflow around the object supported by the three surface support apparatuses, inhibiting the object from contacting the countertop or work surface (e.g., a dirty cutting board, a heated baking sheet, a pot lid having condensation or food splatter, etc.), and/or providing improved access to the object being supported (e.g., positioning a heat-protective mitt under the supported object). In continuing this example, the placement of the three surface support apparatuses can modify the contact support surface to accommodate objects having different dimensions (e.g., different sized pots, different sized baking sheets, etc.). In another example, one or more surface support apparatuses can be placed on a surface and an object, such as a computing device, can be placed on the contact support surface created by the one or more surface support apparatuses, thereby improving airflow by a fan associated with the computing device and improving processor cooling of a hardware processor associated with the computing device. In yet another example, in an oven environment, a first set of surface support apparatuses can be placed on a surface to support a first object (e.g., a baking sheet with a first food item) and a second set of surface support apparatuses can be placed on the first object (e.g., a baking sheet with a first food item) to support a second object (e.g., another baking sheet with a second food item), thereby increasing cooking area (e.g., without relying on fixed rack positions in the oven). In a further example, in a kitchen environment, a first set of surface support apparatuses can be placed on a surface to support a first object (e.g., a baking sheet with a food item) and a second set of surface support apparatuses can be placed on the top surface of the first object (e.g., a baking sheet) to support the food item, thereby improving airflow around the first object and airflow around the food item.

These and other features of a surface support apparatus are further described in connection with FIGS. 1-9.

Turning to FIG. 1, an illustrative example of a surface support apparatus 100 in accordance with some embodiments of the disclosed subject matter is shown. As shown, surface support apparatus 100 can be any suitable apparatus having a four-legged tetrahedron structure for supporting one or more objects. For example, the four-legged tetrahedron structure can include a centroid 110 at the geometric center of the tetrahedron structure and four vertices 120. In continuing this example, each leg 130 of the four legs of surface support apparatus 100 can extend outwardly from centroid 110 of the four-legged tetrahedron structure to one of the four vertices 120. As shown in FIG. 1, each leg 130 can be formed to have a tubular shape that has a center axis 140 parallel to a plane containing one of the four vertices 120. As also shown in FIG. 1, each leg 130 can have the same length (e.g., the distance between an end of center axis 140 at centroid 110 and an opposing end of center axis 140 at a vertex 120) and the same volume.

It should also be noted that each leg 130 in the four-legged tetrahedron structure of surface support apparatus 100 can be equally distributed in position around the centroid to form four equivalent sub-polyhedron volumes of the tetrahedron structure. This can, for example, allow surface support apparatus 100 to be supported on a resting surface by three of the four legs 120 of the four-legged tetrahedron structure at all times in response to dropping, throwing, or otherwise placing surface support apparatus 100 on the resting surface (e.g., a countertop, a stovetop, a desktop, a cutting board, an object, etc.). This can also allow the remaining leg 120 of the four-legged tetrahedron structure (e.g., leg 120 that is positioned in an upward direction) that is not in contact with the resting surface, which has a contact support surface formed about the tip portion 150 of the leg, in combination with another surface support apparatus 100 and its corresponding contact support surface to support an object at an overall vertical height from the resting surface to the contact support surface. For example, regardless of which three legs of the four-legged tetrahedron structure support a surface support apparatus that has been dropped, thrown, or otherwise placed on a resting surface, an object placed on the contact support surface of multiple surface support apparatuses can be supported at a contact vertical height (e.g., the distance between the resting surface and the overall height of the surface support apparatus).

Figure 2:
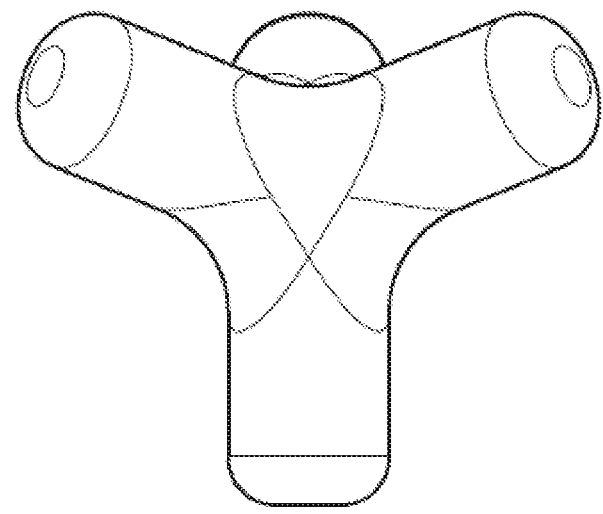
FIG. 2 is a rotated view of the surface support apparatus of FIG. 1 in accordance with some embodiments of the disclosed subject matter.

This is also shown, for example, in FIG. 2, which shows a rotated view of surface support apparatus 100 in accordance with some embodiments of the disclosed subject matter. As shown in FIG. 2, each leg 130 in the four-legged tetrahedron structure of surface support apparatus 100 can be equally distributed in position around the centroid to form four equivalent sub-polyhedron volumes of the tetrahedron structure, where three of the four legs 120 of the four-legged tetrahedron structure that are placed on a resting surface are positioned in an upward direction and where the remaining leg 120 of the four-legged tetrahedron structure that is not in contact with the resting surface is positioned in a downward direction).

Figure 3:
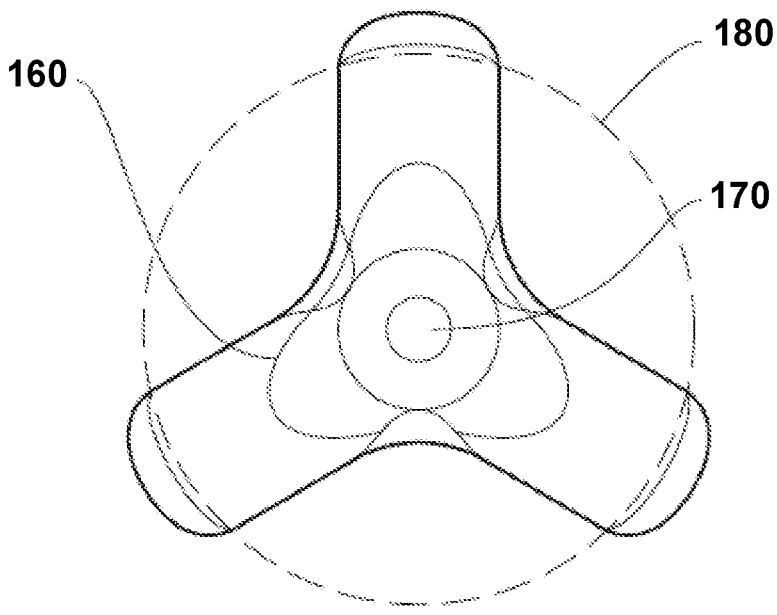
FIG. 3 is a top plan view of the surface support apparatus of FIG. 1 in accordance with some embodiments of the disclosed subject matter.

Turning to FIG. 3, which shows an illustrative example of a top plan view of surface support apparatus 100 in accordance with some embodiments of the disclosed subject matter. As shown, tip portion 150 of each leg 130 in the four-legged tetrahedron structure of surface support apparatus 100 can be formed about surface tangent lines 160 to create a contact support surface 170. Contact support surface 170 can be used to support an object from a vertical height from a resting surface that surface support apparatus 100 has been placed on. It should also be noted that contact support surface 170 of three of the four legs 120 of the four-legged tetrahedron structure can be used to support surface support apparatus 100 on a resting surface that surface support apparatus 100 has been placed on (e.g., a countertop, a stovetop, a desktop, a cutting board, an object, etc.).

Figure 4:
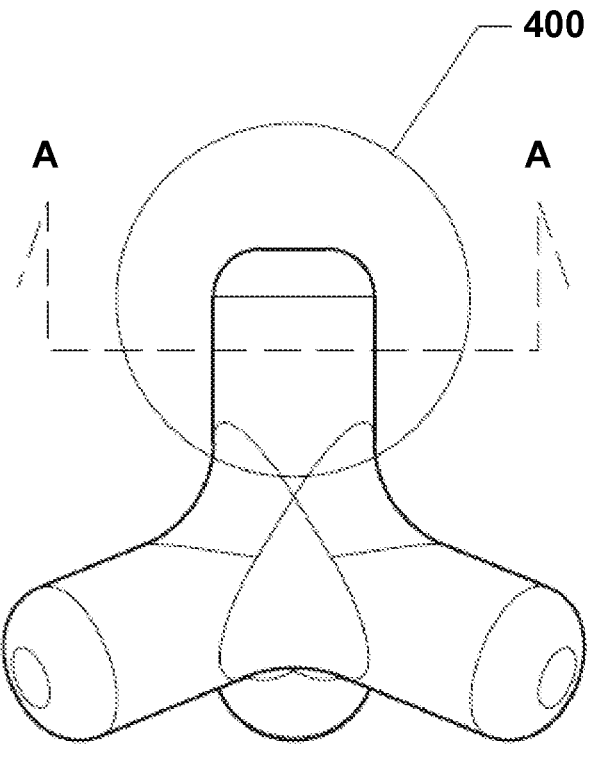
FIG. 4 is a front view of a surface support apparatus, where each leg of the surface support apparatus can have a rounded tip, in accordance with some embodiments of the disclosed subject matter.
Figure 5:
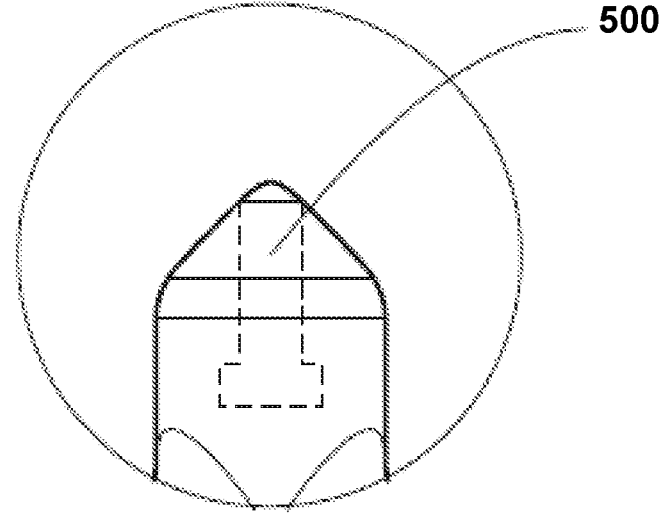
FIG. 5 is an alternative view of the leg of the surface support apparatus along line A-A shown in FIG. 4 in which the leg can have a pointed tip in accordance with some embodiments of the disclosed subject matter.

In some embodiments, as shown in FIGS. 4 and 5, tip portion 150 of each leg 130 in the four-legged tetrahedron structure of surface support apparatus 100 and corresponding contact support surface 170 can have any suitable shape. For example, as shown in region 400 of FIG. 4, tip portion 150 of each leg 130 in the four-legged tetrahedron structure of surface support apparatus 100 can have a rounded cylindrical shape and corresponding contact support surface 170 on tip portion 150 can have a circular shape. In another example, as shown in FIG. 5, tip portion 150 of each leg 130 in the four-legged tetrahedron structure of surface support apparatus 100 can have a pointed shape and corresponding contact support surface 170 on tip portion 150 can have a circular shape. Although contact support surface 170 in FIGS. 1-5 is shown as having a circular shape, this is merely illustrative and contact support surface 170 can have any suitable shape (e.g., a square shape, a rectangular shape, an oval shape, etc.).

Referring back to FIG. 3, it should also be noted that surface support apparatus 100 can have any suitable dimensions. For example, as shown in FIG. 3, surface support apparatus 100 can have dimensions that are greater than a choking hazard threshold diameter as shown by 180. In a more particular example, in response to determining that a child choking hazard threshold diameter is about 3 centimeters in diameter, surface support apparatus 100 can be formed to have an overall diameter greater than the child choking hazard threshold diameter of about 3 centimeters in diameter, where each leg diameter can have a diameter of about 10 millimeters. In another example, surface support apparatus 100 having different dimensions can be formed. In continuing this example, surface support apparatus 100 can be formed to support objects, such as sheet pans of different sizes and pots of different sizes, to allow for improved cooling from the oven and/or stove while protecting work surfaces, while another surface support apparatus 100 can be formed to support objects used in a commercial kitchen environment, such as larger sheet pans, larger pots, and objects having a higher temperature (e.g., over 300 degrees Celsius).

It should also be noted that surface support apparatus 100 can be formed using any suitable material. For example, as the applications described herein are in connection with kitchen environments, surface support apparatus 100 can be formed using silicone rubber, such that surface support apparatus 100 can be manufactured in a variety of sizes and colors, while being food-safe and non-scratching and being applicable to a wide range of temperature environments. In continuing this example, surface support apparatus 100 can be molded using different types of silicone rubber materials that have different heat ratings (e.g., capable of withstanding temperatures of about 200 degrees Celsius or less, capable of withstanding temperatures of about 300 degrees Celsius or less, etc.). In a more particular example, each leg 130 in the four-legged tetrahedron structure of surface support apparatus 100 can be formed to have a body portion that has a tubular shape. Surface support apparatus 100 can have structural stability and a reduced material mass in part due to the tubular shape of each leg 130 of surface support apparatus 100. For example, the tubular shape of each leg 130 of surface support apparatus 100 can taper in thickness from the centroid 110 of the tetrahedron structure towards contact support surface 170 formed at one of the four vertices 120 of the tetrahedron structure.

It should be noted that, in some embodiments, each leg 130 of surface support apparatus 100 can have an outer portion and an inner portion, where the outer portion of each leg 130 can be composed of a first material (e.g., a stainless steel, metal, or polymeric material) and where the inner portion of each leg 130 can be composed of a second material (e.g., air such that the leg has a hollow interior cavity). In another example, the outer portion of each leg 130 can be composed of a first material, such as food-grade silicone, and the inner portion of each leg 130 can be composed of a second material, such as stainless steel. In yet another example, as shown in FIG. 5, surface support apparatus 100 can be co-molded in which two different materials are fused together to form each leg 130, such as an inner core 500 of leg 130 being composed of a magnetic material within an outer portion of leg 130 being composed of a silicone rubber material. Alternatively, surface support apparatus 100 can be co-molded in which two different rubber materials are fused together to form each leg 130, such as an inner core 500 of leg 130 being composed of a harder silicone rubber or polymeric material within an outer portion of leg 130 being composed of a silicone rubber material (e.g., having a different hardness than the material used in inner core 600).

It should also be noted that, although the embodiments described herein show that each leg 130 of surface support apparatus 100 has a generally tubular shape, this is merely illustrative. In some embodiments, each leg 130 of surface support apparatus 100 can have a triangular tube shape in which the cross-section of the leg is generally triangular. In some embodiments, each leg 130 of surface support apparatus 130 can have a triangular tube shape that tapers in thickness from the centroid of the tetrahedron structure towards the contact support surface formed at one of the four vertices of the tetrahedron structure in which the cross-section of the leg is generally triangular.

Additionally or alternatively, in some embodiments, each leg 130 of surface support apparatus 100 can have an outer portion that is composed of a first material, such as a silicone rubber material, and one or more magnetic elements can be positioned with an inner portion of each leg portion. For example, the magnetic elements within a leg 130 of surface support apparatus 100 can interact with the magnetic elements within a leg 130 of another surface support apparatus 100 (e.g., an adjacent surface support apparatus that is within the magnetic field of the magnetic elements within the leg of the surface support apparatus). In a more particular example, a first magnetic element within a leg of a first surface support apparatus and a second magnetic element with a leg of a second surface support apparatus can be configured to magnetically couple such that the first surface support apparatus and the second support apparatus remain within a particular region for supporting one or more objects. In another more particular example, a first magnetic element within a leg of a first surface support apparatus and a second magnetic element with a leg of a second surface support apparatus can be configured to magnetically couple to connect the first surface support apparatus and the second surface support apparatus, thereby forming a larger contact support surface.

Additionally or alternatively, in some embodiments, one or more legs 130 of surface support apparatus 100 can be configured to include a wireless communication circuit within the inner portion of a leg. For example, a wireless communication circuit can be positioned in the inner portion of a leg for interfacing with one or more communication networks. In continuing this example, each tip portion of the surface support apparatus can be configured to include one or more sensors (e.g., temperature sensors, pressure sensors, touch sensors, etc.), where the wireless communication circuit can be configured to transmit sensor data from any suitable sensors within the surface support apparatus to a mobile application or any other suitable computing device. In a more particular example, the wireless communication circuit can be configured to transmit sensor data indicating that a surface support apparatus is currently in use (e.g., sensor data from a pressure sensor can indicate that an object has been positioned on a contact support surface of a leg of the surface support apparatus, sensor data from a temperature sensor can indicate an approximate surface temperature of an object that is in contact with a contact support surface of a leg of the surface support apparatus, etc.). As shown in FIG. 5, the wireless communication circuit and/or the one or more sensors can be embedded within region 500 that is covered with an outer portion composed of silicone rubber.

Figure 6:
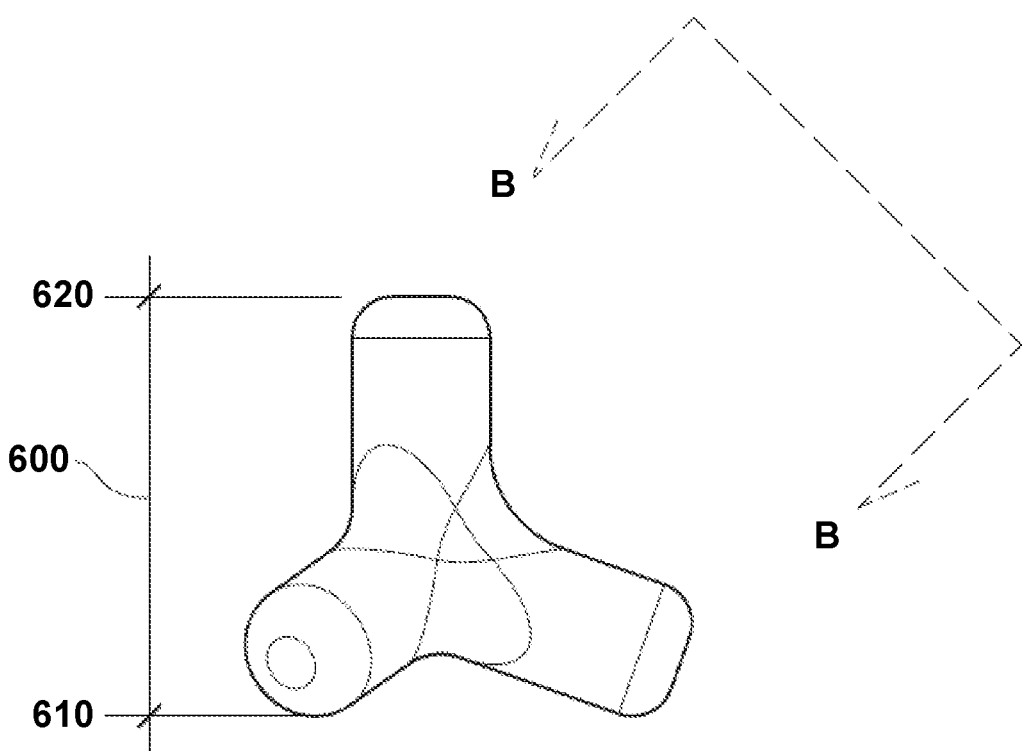
FIG. 6 is a right side view of the surface support apparatus of FIG. 1, where any three legs of the surface support apparatus can be in contact with a resting surface and where a contact support surface at the tip of the remaining leg of the surface support apparatus can support an object at a height between the resting surface and the tip of the remaining leg of the surface support apparatus, in accordance with some embodiments of the disclosed subject matter.
Figure 7:
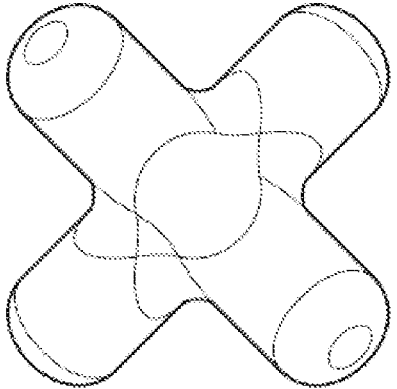
FIG. 7 is a perspective view of the surface support apparatus of FIG. 1 along line B-B shown in FIG. 6 in accordance with some embodiments of the disclosed subject matter.

Turning to FIGS. 6 and 7, regardless of which three legs of the four-legged tetrahedron structure support a surface support apparatus that has been dropped, thrown, or otherwise placed on a resting surface, an object placed on the contact support surface of multiple surface support apparatuses can be supported at a contact vertical height 600 (e.g., the distance between the resting surface at position 610 and the overall height of the surface support apparatus at position 620). For example, the surface support apparatus can have leg diameters of about 10 millimeters with the contact vertical height 600 of about 30 millimeters when placed on a flat surface.

It should be noted that the surface support apparatus can be constructed to have any suitable contact vertical height 600. For example, different surface support apparatus can be fabricated based on the type of application (e.g., residential kitchen applications, commercial kitchen applications, computing device applications, applications involving heated items, applications involving frozen or cold items, applications involving the support of small or lightweight objects, applications involving the support of large or heavy objects, etc.).

FIG. 7 shows a perspective view of the surface support apparatus of FIG. 1 along line B-B shown in FIG. 6 in accordance with some embodiments of the disclosed subject matter.

Figure 8:
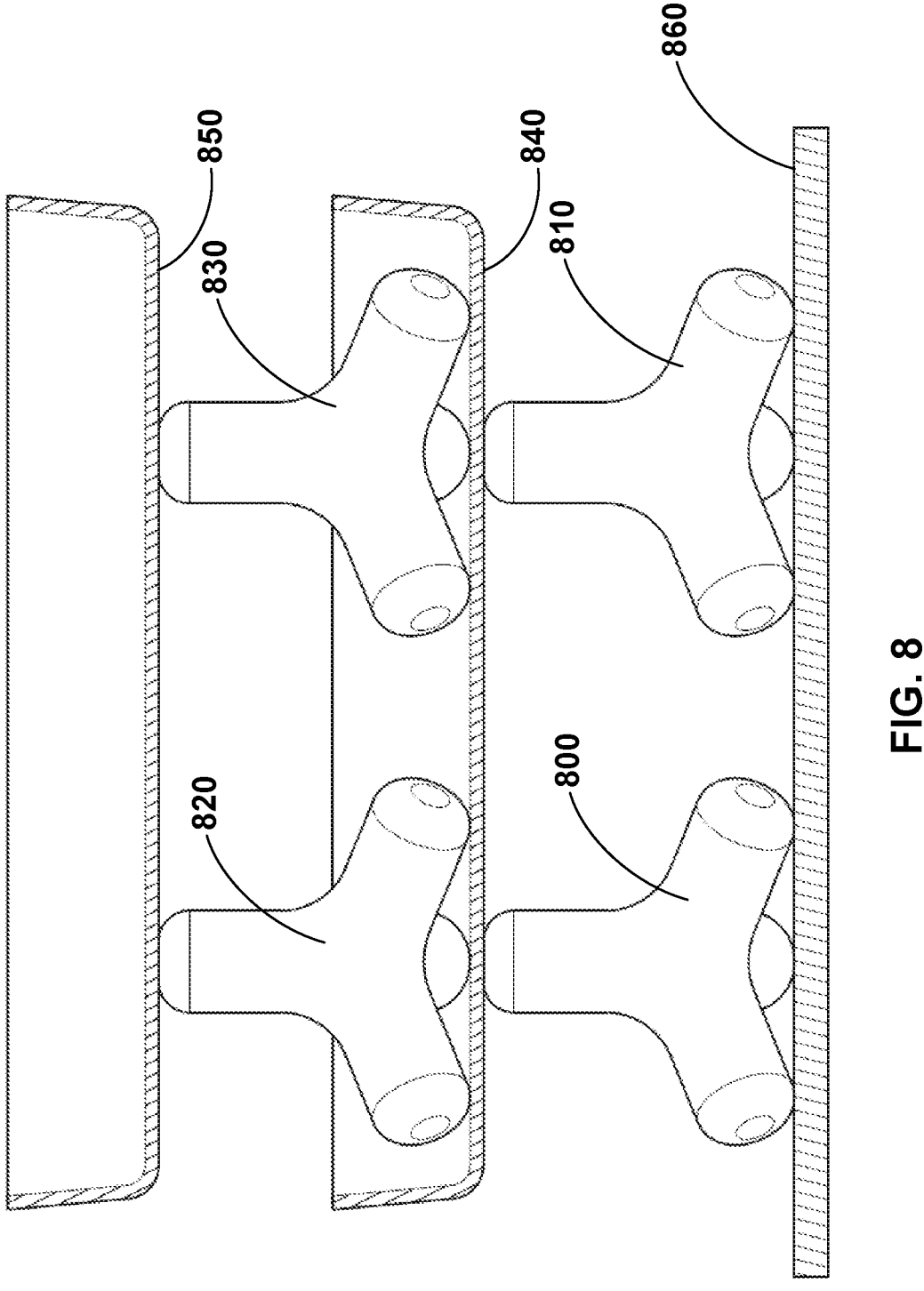
FIG. 8 is an illustrative example of a plurality of surface support apparatus being placed to support one or more objects in accordance with some embodiments of the disclosed subject matter.

Turning to FIG. 8, in some embodiments, multiple surface support apparatus 800, 810, 820, and 830 can be used to support one or more objects 840 and 850 from a resting surface 860. As shown, surface support apparatuses 800 and 810 (which can include any suitable number of surface support apparatus, such as three surface support apparatuses) can be placed on a surface 850 (e.g., a countertop, a cooktop, etc.), where surface support apparatuses 800 and 810 can support an object 840 (e.g., a baking sheet that contains food items) at a given height from resting surface 860. As also shown, surface support apparatuses 820 and 830 (which can include any suitable number of surface support apparatus, such as three surface support apparatuses) can be placed within object 840 (e.g., contacting a top surface of object 840), where surface support apparatuses 820 and 830 can support an object 850 (e.g., a baking sheet that contains food items) at a given height from the top surface of object 840.

Although the embodiments described herein generally describe the surface support apparatus in a trivet application for objects containing food items (e.g., holding hot baking sheets or pots over surfaces), this is merely illustrative. The surface support apparatus can be used in various applications, such as a surface for drying wood cutting boards to prevent warpage, a surface for holding a bar of soap, a surface for defrosting food to provide improved air circulation about the frozen food item, a surface for placing computing devices to provide improved air circulation, an angled surface for placing computing devices (e.g., two surface support apparatus supporting one end of a computing device), etc.

It should be noted that, in some embodiments, at least three surface support apparatuses can be used to support an object above a resting surface on which the at least three surface support apparatuses are placed, where the contact support surface of each of the at least three surface support apparatuses can support the object at a uniform height above the resting surface. Any suitable number of surface support apparatuses can be used to support an object. For example, the number of surface support apparatuses can be dependent on the dimensions of the object, the weight of the object, the application (e.g., supporting an object for cooling over a resting surface on which objects having a temperature greater than a particular value should not be placed, supporting an object to increase airflow beneath at least a portion of the object, etc.).

Turning to FIG. 9, an illustrative example of a process 900 for using a plurality of surface support apparatus to support one or more objects in accordance with some embodiments of the disclosed subject matter is shown.

As shown, process 900 can begin at block 910 in some embodiments by obtaining multiple surface support apparatuses for an intended application. This can include, for example, obtaining three surface support apparatuses to support an object, such as a baking sheet containing food items that has been removed from an oven or a pot containing food items that has been removed from a stovetop.

At 920, the multiple surface support apparatuses can be placed on a resting surface, such as a countertop surface, a cooktop surface, a desktop surface, etc. The multiple surface support apparatuses can, for example, be positioned at particular locations on the resting surface or rolled from a user's hand onto the resting surface. In continuing this example, in embodiments in which the surface support apparatuses are configured to include magnetic elements, the magnetic elements of the surface support apparatuses can arrange the placed surface support apparatuses such that they remain within a given area. In another example, in embodiments in which the surface support apparatuses are configured to include wireless communication circuits and one or more sensors, the wireless communication circuits can communicate with an application executing on a computing device to instruct the user to position the surface support apparatuses in a particular pattern based on a given application.

At 930, upon placing the multiple surface support apparatuses can be placed on the resting surface in which three of the four legs of each of the surface support apparatuses are contacting the resting surface, an object can be placed on the surface support apparatuses, where the contact support surface on the remaining leg of each of the multiple surface support apparatuses that is not in contact with the resting surface supports the object at a given height above the resting surface.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of process 900 can be executed or performed in any order or sequence not limited to the order and sequence shown in and described in connection with FIG. 9. Also, some of the above blocks of process 900 can be executed or performed substantially simultaneously where appropriate or in parallel to reduce latency and processing times. Additionally or alternatively, some of the above described blocks of process 900 can be omitted.

Accordingly, a surface support apparatus and methods for using the same are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A surface support system comprising:
   a plurality of surface support apparatuses, wherein each of
      the plurality of surface support apparatuses comprises
      a tetrahedron structure having a centroid at a geometric
      center of the tetrahedron structure, four vertices of the
      tetrahedron structure, and four leg portions that each extend outwardly from the centroid of the tetrahedron structure to one of the four vertices of the tetrahedron structure, wherein each leg portion has a body portion having a tubular shape and a leg tip portion located at an end of a leg portion and around one of the four vertices of the tetrahedron structure that opposes the centroid of the tetrahedron structure, wherein the leg tip portion includes a substantially convex contact support surface formed at one of the four vertices of the tetrahedron structure, wherein each leg portion of the four leg portions has a same length and a same volume as other leg portions in the tetrahedron structure, and wherein the four leg portions are equally distributed in position around the centroid to form four equivalent sub-polyhedron volumes of the tetrahedron structure such that the tetrahedron structure has an overall height from a resting surface to the substantially convex contact support surface regardless of which three of the four leg portions are placed on the resting surface; and
    wherein the plurality of surface support apparatuses are configured to support an object on the substantially convex contact support surface of one leg portion from each of the plurality of surface support apparatuses at the overall height of each of the plurality of surface support apparatuses over the resting surface.

2. The surface support system of claim 1, wherein the plurality of surface support apparatus are three surface support apparatuses used to support the object on the substantially convex contact support surface of one leg portion from each of the three surface support apparatuses.

3. The surface support system of claim 1, wherein each leg portion of each of the plurality of surface support apparatuses includes an outer portion and an inner portion, and wherein the outer portion of each leg portion is composed of a first material and wherein the inner portion of each leg portion is composed of a second material.

4. The surface support system of claim 1, wherein the tubular shape of each leg portion of each of the plurality of surface support apparatuses tapers in thickness from the centroid of the tetrahedron structure towards the substantially convex contact support surface formed at one of the four vertices of the tetrahedron structure.

5. The surface support system of claim 1, wherein each leg portion of each of the plurality of surface support apparatuses includes an outer portion and an inner portion, and wherein the inner portion of each leg portion is composed of a magnetic material, and wherein the magnetic material interacts with at least one of the resting surface and the plurality of surface support apparatuses.

6. The surface support system of claim 1, wherein at least one of the four leg portions of the tetrahedron structure is configured to include a wireless communication circuit within the inner portion of a leg portion.

7. The surface support system of claim 1, wherein the leg tip portion has a rounded shape.

8. The surface support system of claim 1, wherein the leg tip portion has a pointed shape.

9. The surface support system of claim 1, wherein the leg tip portion is composed of a different material than the body portion of each leg portion.

10. The surface support system of claim 1, wherein the leg tip portion is configured to include at least one sensor.

11. A surface support apparatus comprising:
    a tetrahedron structure having a centroid at a geometric center of the tetrahedron structure, four vertices of the tetrahedron structure, and four leg portions that each extend outwardly from the centroid of the tetrahedron structure to one of the four vertices of the tetrahedron structure, wherein each leg portion has a body portion having a tubular shape and a leg tip portion located at an end of a leg portion and around one of the four vertices of the tetrahedron structure that opposes the centroid of the tetrahedron structure, wherein the leg tip portion includes a substantially convex contact support surface formed at one of the four vertices of the tetrahedron structure, wherein each leg portion of the four leg portions has a same length and a same volume as other leg portions in the tetrahedron structure, and wherein the four leg portions are equally distributed in position around the centroid to form four equivalent sub-polyhedron volumes of the tetrahedron structure such that the tetrahedron structure has an overall height from a resting surface to the substantially convex contact support surface regardless of which three of the four leg portions are placed on the resting surface; and
    wherein the surface support apparatus and at least one additional surface support apparatus are configured to support an object on the substantially convex contact support surface of one leg portion from each of the surface support apparatus and the at least one additional surface support apparatus at the overall height of each of the plurality of surface support apparatuses over the resting surface.

12. A surface support apparatus comprising:
    a tetrahedron structure having a centroid at a geometric center of the tetrahedron structure, four vertices of the tetrahedron structure, and four leg portions that each extend outwardly from the centroid of the tetrahedron structure to one of the four vertices of the tetrahedron structure, wherein each leg portion has a body portion having a tubular shape and a leg tip portion located at an end of a leg portion and around one of the four vertices of the tetrahedron structure that opposes the centroid of the tetrahedron structure, wherein the leg tip portion includes a contact support surface formed at one of the four vertices of the tetrahedron structure, wherein each leg portion of the four leg portions has a same length and a same volume as other leg portions in the tetrahedron structure, wherein the four leg portions are equally distributed in position around the centroid to form four equivalent sub-polyhedron volumes of the tetrahedron structure such that the tetrahedron structure has an overall height from a resting surface to the contact support surface regardless of which three of the four leg portions are placed on the resting surface, wherein each leg portion includes an outer portion and an inner portion, wherein the outer portion of each leg portion is composed of a first material, and wherein the inner portion of each leg portion is composed of a second material; and
    wherein the surface support apparatus and at least one additional surface support apparatus are configured to support an object on the contact support surface of one leg portion from each of the surface support apparatus and the at least one additional surface support apparatus at the overall height of each of the plurality of surface support apparatuses over the resting surface.

13. The surface support apparatus of claim 11, wherein the tubular shape of each leg portion of the surface support apparatus tapers in thickness from the centroid of the tetrahedron structure towards the substantially convex contact support surface formed at one of the four vertices of the tetrahedron structure.

14. The surface support apparatus of claim 11, wherein each leg portion includes an outer portion and an inner portion, and wherein the inner portion of each leg portion is composed of a magnetic material, and wherein the magnetic material interacts with at least one of the resting surface and another surface support apparatus.

15. The surface support apparatus of claim 11, wherein at least one of the four leg portions of the tetrahedron structure is configured to include a wireless communication circuit.

16. The surface support apparatus of claim 11, wherein the leg tip portion has a rounded shape.

17. The surface support apparatus of claim 11, wherein the leg tip portion has a pointed shape.

18. The surface support apparatus of claim 11, wherein the leg tip portion is composed of a different material than the body portion of each leg portion.

19. The surface support apparatus of claim 11, wherein the leg tip portion is configured to include at least one sensor.

*     *     *     *     *